Sept. 27, 1932.  H. W. EAKINS  1,879,927
MACHINE FOR MAKING POP CORN CONFECTIONS
Filed Jan. 16, 1931  3 Sheets-Sheet 3
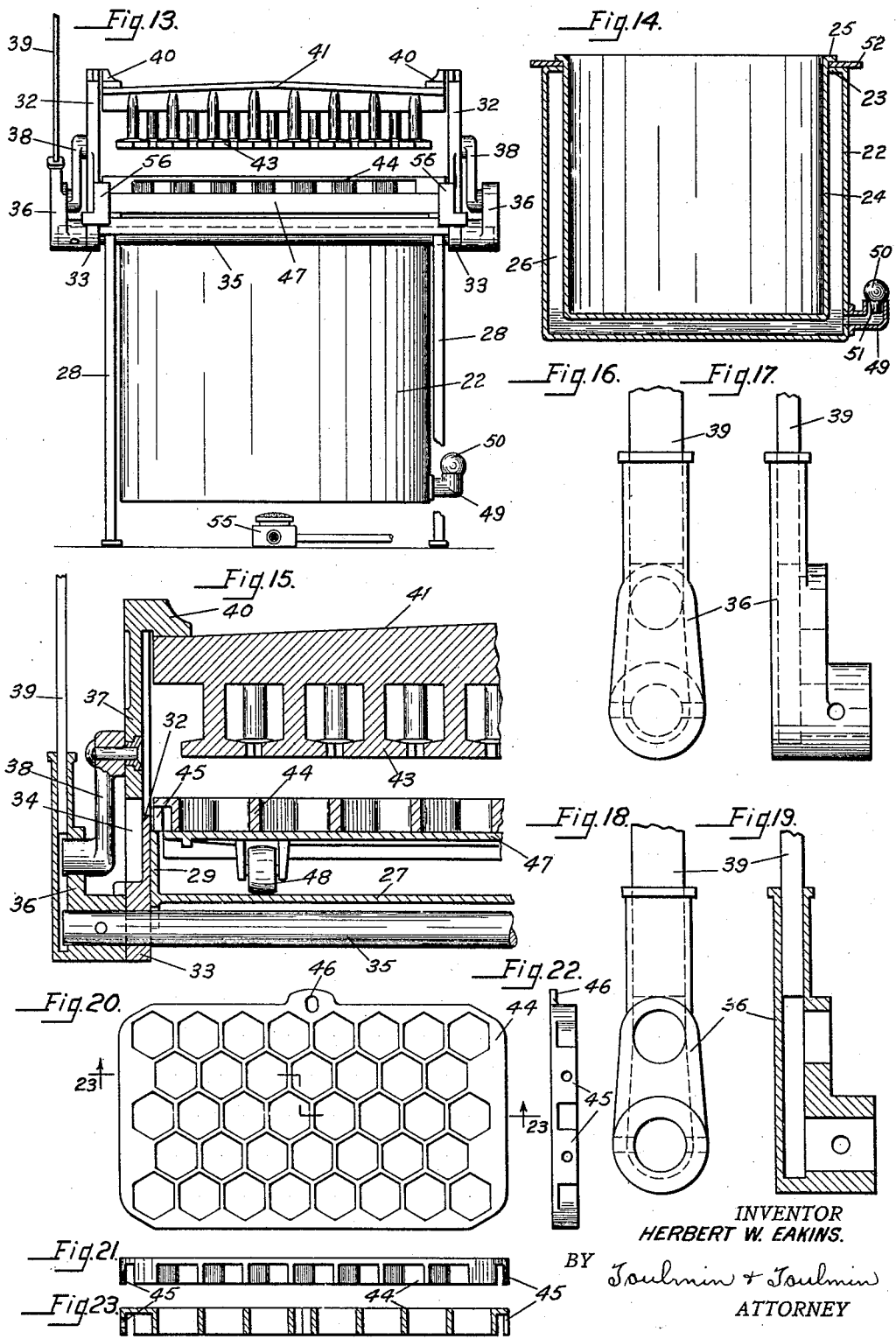
INVENTOR
HERBERT W. EAKINS.
BY Toulmin + Toulmin
ATTORNEY Patented Sept. 27, 1932

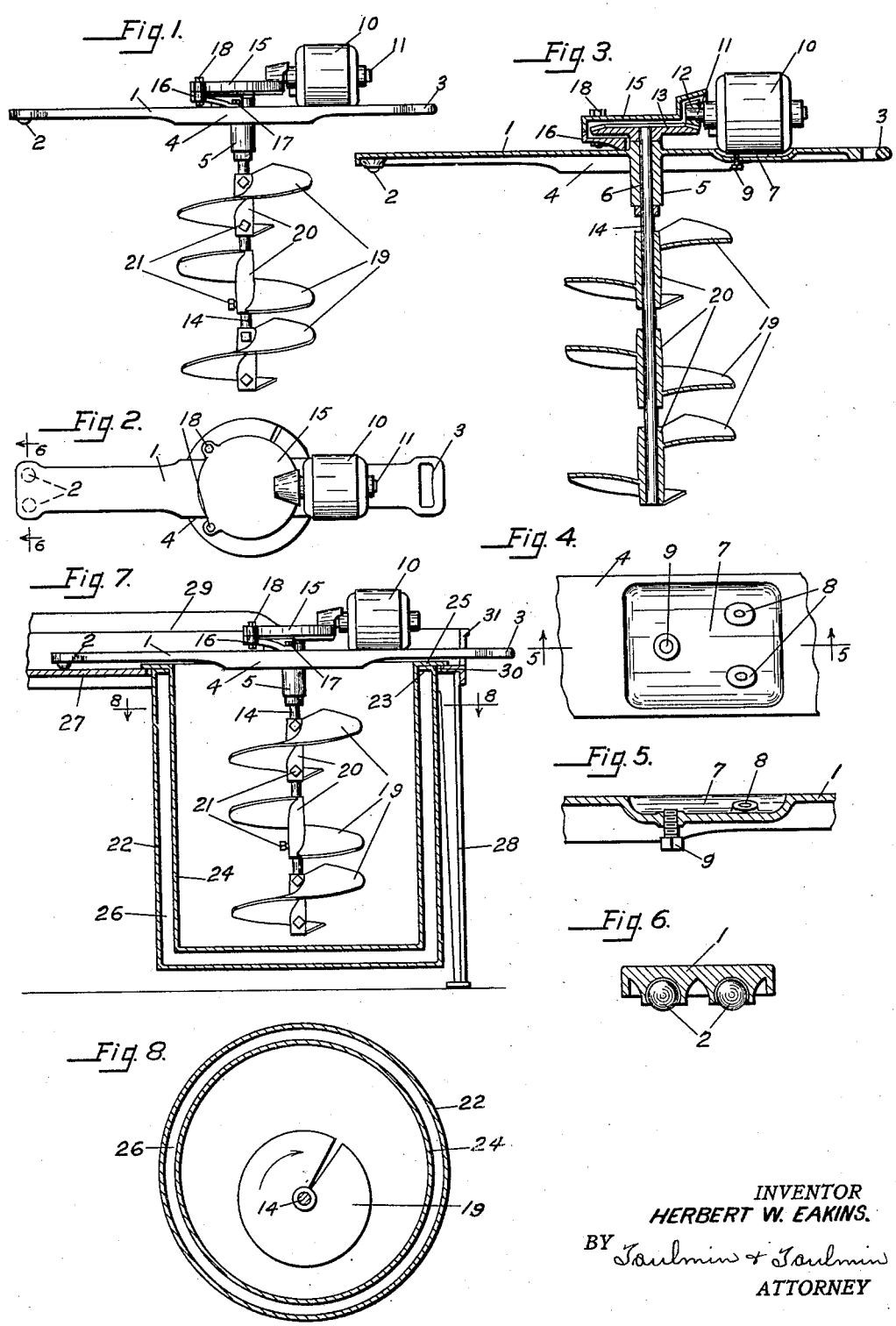

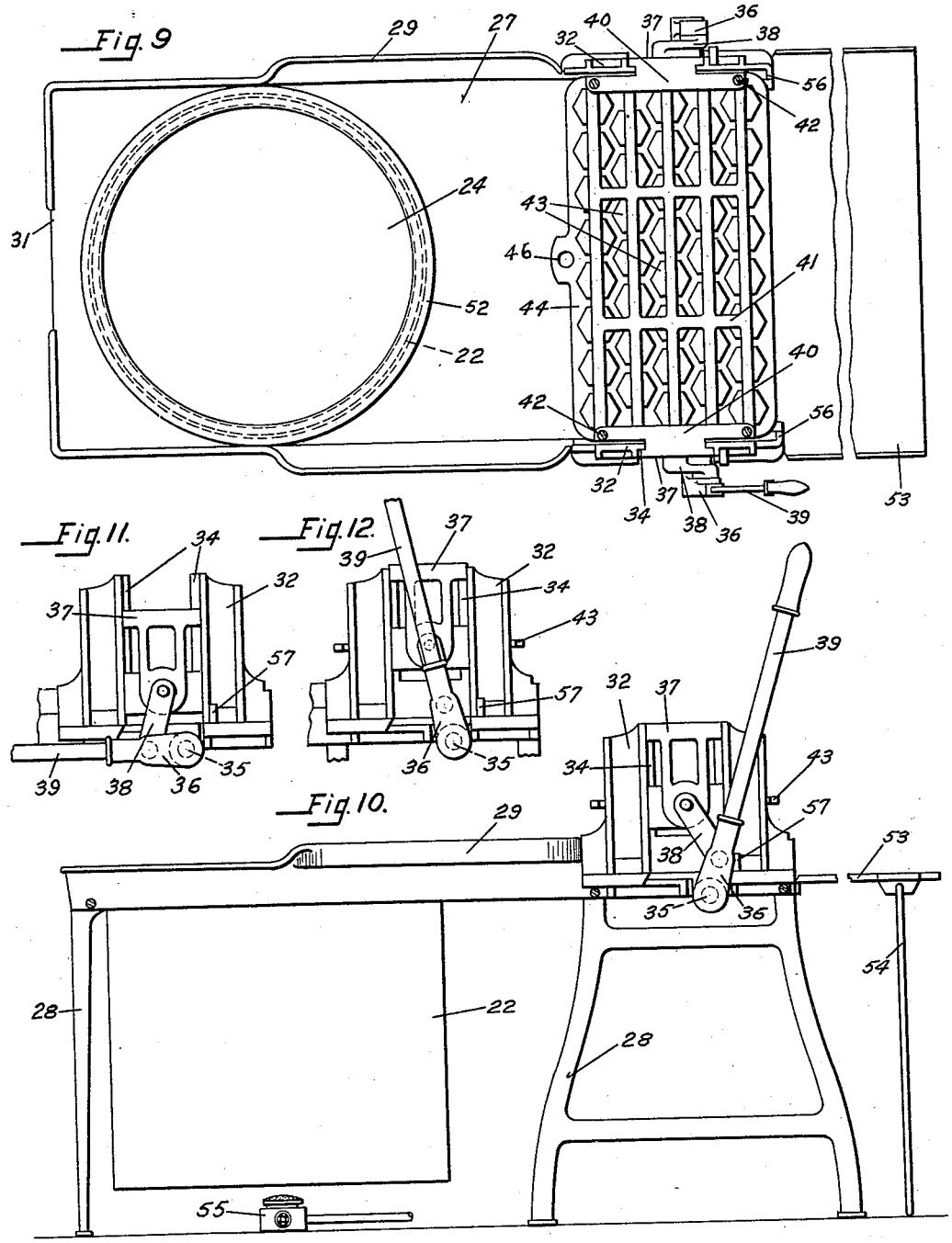

1,879,927

UNITED STATES PATENT OFFICE

HERBERT W. EAKINS, OF SPRINGFIELD, OHIO

MACHINE FOR MAKING POP CORN CONFECTIONS

Application filed January 16, 1931. Serial No. 509,096.

This invention relates to apparatus for heating and mixing popcorn and syrup, and has for its object to provide a means adapted for use in connection with various heating and mixing devices.

It is an object of this invention to provide a mixer supported by a unitary base, which has mounted thereon suitable operating power means.

It is also an object of this invention to provide, in connection with a stirring apparatus for confections of various kinds, means for forming the confections into cakes and compressing them into compact bodies.

It is also an object of this invention to provide, in connection with a stirring apparatus, means for heating and maintaining in a warm condition the matter to be stirred. This is obtained by having a double wall container. This container has vent means whereby the extent of water within the container may be determined, and if too much steam pressure be created the pressure may be released by an automatically operated steam pressure valve.

These and other advantages will appear from the following description taken in connection with the drawings.

Referring to the drawings:

Figure 1 is a side elevation of the stirring apparatus.

Figure 2 is a top plan view of the apparatus shown in Figure 1.

Figure 3 is a vertical section.

Figure 4 is a top plan view of part of the base plate showing the depression in which the motor is located.

Figure 5 is a section on the line 5—5 of Figure 4.

Figure 6 is a section on the line 6—6 of Figure 2.

Figure 7 is a sectional view of a container with the stirring apparatus mounted thereon.

Figure 8 is a section on the line 8—8 of Figure 7.

Figure 9 is a top plan view of a table in one end of which is the stirring apparatus and container shown in Figure 7, and on the other end of which is the cake forming part of the apparatus.

Figure 10 is a side elevation of the apparatus as shown in Figure 9.

Figure 11 is a detail view showing the presser operating means in its lowered position.

Figure 12 is a view similar to Figure 11 but showing the presser operating means in its elevated position.

Figure 13 is an end view of the apparatus as shown in Figure 9, looking from the right-hand side.

Figure 14 is a vertical section through the container showing the pressure release means.

Figure 15 is a vertical section through one end of the presser apparatus for compressing the popcorn into bars or cakes.

Figure 16 is a side elevation of the operating handle for raising and lowering the presser.

Figure 17 is a view taken at a right angle to that shown in Figure 16.

Figure 18 is a view opposite to that shown in Figure 16.

Figure 19 is a longitudinal section through the handle shown in Figures 16, 17 and 18.

Figure 20 is a top plan view of the mold plate.

Figure 21 is a side elevation of the mold plate.

Figure 22 is an end elevation of the mold plate.

Figure 23 is a section on the line 23—23 of Figure 20.

In Figure 1 there is shown a mixing and stirring apparatus adapted to be used with various forms of containers and for mixing different materials. The main part of this apparatus consists of a base plate 1, relatively long in comparison with its width. This plate has at one end ball bearings 2, and at the other end a handle 3. By this means the plate may be easily supported on a table or some other suitable support and rolled over the top thereof. Near the center of the base plate, between the handle and the ball bearings, is a central enlargement 4 which has extending downwardly therefrom in its center a boss 5, with a hole 6 therein.

Between the boss 5 and the handle 3 is a depression 7 adapted to form a seat for a motor. This depression is rectangular in shape and has in one end two pads 8. These pads may be formed of any suitable material, such as fiber, rubber or felt. In the other end of the depression is a screw 9 for engaging the under side of the motor casing 10 for adjusting purposes, the other end of the motor resting upon the pads 8. The motor has the usual shaft 11 which has on one end a pinion 12 engaging a gear 13. The gear 13 is located on the upper end of a shaft 14, which extends through the hole 6 in the boss 5.

Inclosing the pinion 12 and the gear 13 is a casing 15, which is supported on the base plate 1 by means of a bracket 16. The bracket 16 is fastened to the base plate by means of screws 17, while the casing is fastened to the bracket 16 by means of screws 18. By means of this housing the gear mechanism is protected from dirt, dust, grit and other foreign matter. On the shaft 14 is a plurality of blades 19. Each blade 19 has a hub 20 with an opening therein to receive the shaft 14, and is held on the shaft by means of screws 21.

From an examination of Figure 1 it will be noticed that the blade is spiral in shape and extends approximately around the shaft. These blades are so arranged and spaced that when the shaft rotates the material being stirred or mixed is moved upwardly from the bottom of the container toward the top, each blade bringing the material stirred to the vicinity of the next adjacent higher blade. By this means there is a continuous upward travel of the material being mixed along the shaft and down along the edge of the container.

By means of the ball bearings 2 and the handle 3 the position of the blades may be shifted in the container. In Figure 8 the blades are shown nearer one side of the container than the other. The blades may be moved adjacent any side or be held in the middle of the container. By this means the contents of the container are thoroughly mixed and agitated.

It will be noticed from an examination of Figures 7 and 14 that the container disclosed here is a double wall container or a container within a container. The outer container is indicated by the numeral 22, and has on its upper edges inwardly directed flanges 23. The inner container is indicated by the numeral 24 and has outwardly directed flanges 25 adapted to engage and rest upon the flanges 23. These two containers or receptacles may be joined together by welding the flanges 23 to the flanges 25 so that these become a unitary container with an intervening water space 26.

While this stirrer may be used in connection with various kinds of receptacles or containers, it is shown for use in connection with a container such as that shown in Figures 7 and 14. And when used in connection with the container shown in these figures it is supported on a table 27 which has legs 28. Around the lateral edges and part of one end of the table are flanges 29. In the center of one end of the table is a hole 30 which receives the receptacle or container and supports it in the table. Adjacent the hole and in one end of the table there is a gap 31 in the end flange. This gap forms a space through which the handle end of the stirring apparatus may project, while the ball bearing end of the base plate is supported by the table opposite the gap 31. On each side of the table, at the end opposite the hole 30, is a frame 32.

This frame 32 is attached to the lateral flanges 29 in any suitable manner. In the present instance it is attached thereto by means of screws. In the lower end of each of these frames is a bearing 33, and immediately above each bearing is a guideway 34. Through the bearings there extends a shaft 35, which has on each end an arm 36 for rotating the shaft. In each guideway 34 is a vertically movable bracket 37, which has pivoted at some convenient point thereto one end of an arm 38. The other end of this arm is pivoted to the arm 36. One of the arms 36 has a hole therein to receive a handle 39, by means of which the shaft 35 may be oscillated or rotated. By the oscillation of the shaft 35 the brackets 37 are caused to move up and down in the guideways 34.

On the upper end of each bracket 37 is an inwardly directed projection 40, which is attached to a cross head 41 by means of screws 42. On the lower surface of the cross head is a plurality of plungers 43. These plungers may be of various shapes, but in the present instance they are shown to be hexagonal in shape and adapted to fit into molds having hexagonal sockets therein. These mold sockets are provided in a mold plate 44. Each plate has as many sockets as there are plungers on the cross head. Each end of the mold plate has a flange 45, as clearly shown in Figures 22 and 23, by which the mold plate may be supported on the lateral flanges 29. In one side of the mold plate is a hole 46 by which the plate may be engaged for moving it about on the table. There is also provided a bottom plate 47, which has underneath it rollers 48. This plate is supported on the table and may be moved about on the table by means of the rollers.

When the popcorn and syrup, or other confection, are being compressed the parts are in the position shown in Figures 13 and 15. When in this position, with the mold plate full of the confection, the handle 39 is operated to cause the cross head 41 to descend with the plungers in the cavities in the mold plate so that the material within the mold is compressed. After the popcorn or other material has been compressed the bottom plate may be removed, and when this plate is removed the mold plate rests upon the side flanges 29, the end flanges 45 engaging the side flanges 29 for supporting the mold plate in elevated position. With the bottom plate removed the cross head may be again lowered so that the contents are pressed from the mold, ready to be removed from the table underneath the cross head to an extension suitably attached to the main table.

At one side near the bottom of the receptacle is a spout 49, which extends first laterally and then upwardly. This spout is connected with the interior water space 26. Resting in the upper end of the spout is a ball valve member 50, which has extending downwardly therefrom into the spout a guide projection 51. When the steam pressure within the water space becomes too great the valve 50 is raised and the pressure released, and when it is desired to determine how much water there is in the water space the ball valve may be removed and the depth of the water measured by any suitable means.

In the form of container or receptacle shown in Figure 14 there is a flange 52. In this form this flange is annular in shape, and is inserted between the flanges 23 and 25 and welded thereto. When the container shown in Figure 14 is inserted in the hole in the table, the flange 52 supports the container, whereas in the form shown in Figure 7 the flange 25 supports the container as a whole.

In Figures 9 and 10 there is shown an extension table 53. One end of this table is suitably supported on the table 27, while the other end is supported by legs 54. It is onto this table that the bars or blocks of popcorn are removed after they have been properly formed. During the stirring of the contents of the receptacle it may be necessary to apply heat, and for that purpose there is shown in Figures 10 and 13 a burner or heater 55, located beneath the receptacle or container.

In locating the bottom plate and the molds on the table for molding purposes there are provided stops 56. These stops are on the ends of the flanges 29 and serve to limit the outward movement of these members when they are being positioned for compressing or forming the popcorn into bars or blocks.

There is also shown in Figure 10 a stop 57 to support the handle 39 in inoperative position. In this position the handle holds the cross head slightly elevated off of the mold plate. After the mold plate has been filled and it is desired to compress the contents of the mold the handle 39, as shown in Figure 10, is moved to the left. At first the cross head is slightly elevated, as shown in Figure 12, but as the handle is moved further to the left the cross head is forced downward, causing the plungers to compress the material in the mold plate.

In Figure 11 the cross head is shown in its lower compressed position. When it is desired to remove the cross head and the plungers from the mold the handle is elevated and brought back to a position such as that shown in Figure 10, after which the bars or cakes may be removed from the mold plate to the extension table 53, or to any suitable container or receptacle.

I desire to comprehend within my invention such modifications as may be embraced within my claims and the scope of my invention.

Having thus fully described my invention, what I claim as new and desire to secure by Letters Patent, is:

1. In a machine for making confections, in combination with a table, a frame member extending above the table on each side of the table, each frame member having a bearing and a guideway, a shaft in said bearings, a presser head in said guideways, an operative connection between the shaft and the presser head, and a mold removably supported by said table beneath the presser head.

2. In a machine for making confections, in combination with a table, a frame member extending above the table on each side of the table, each frame member having a bearing and a guideway, a presser head having thereon a plurality of plungers in said guideways, a shaft in said bearings, an operative connection between the presser head and the shaft, a bottom plate, and a mold supported above and independent of the bottom plate beneath the plungers whereby a confection in the mold may be compressed by operating the shaft.

3. In a machine for making confections, in combination with a table, a frame member on each side of said table, each frame member having a bearing and a guideway, a presser head in said guideways, a shaft in said bearings, an arm on each end of the shaft, and a link connecting each arm to the presser head and forming with the arm a toggle connection between the shaft and the head whereby the head is raised and lowered by rotating the shaft.

4. In a machine for making confections, in combination with a table having lateral flanges; a mold plate having a plurality of hexagonal sockets therein adapted to be supported by said table and at each end a downwardly extending supporting flange for engaging the flanges and means to press a confection into said sockets comprising a head having a plurality of hexagonal plungers thereon.

5. In a machine for making confections, in combination with a table having lateral flanges, a mold plate having hexagonal sockets therein adapted to be supported by said table and downwardly extending flanges engaging the table flanges, and means attached to the table flanges to press a confection into said sockets.

6. In a machine for making confections, in combination with a table having lateral flanges, a frame attached to each flange, each frame having a bearing and a guideway, a shaft in the bearings, a presser head in the guideways, and an operative connection between the shaft and the presser head for reciprocating the presser head.

7. In a machine for making confections, in combination with a table having lateral flanges, a bottom plate supported on the table between the flanges, a mold supported on the flanges, and means attached to and supported by the flanges for pressing material in the mold supported by the bottom plate.

In testimony whereof, I affix my signature.

HERBERT W. EAKINS.